Figure 1:
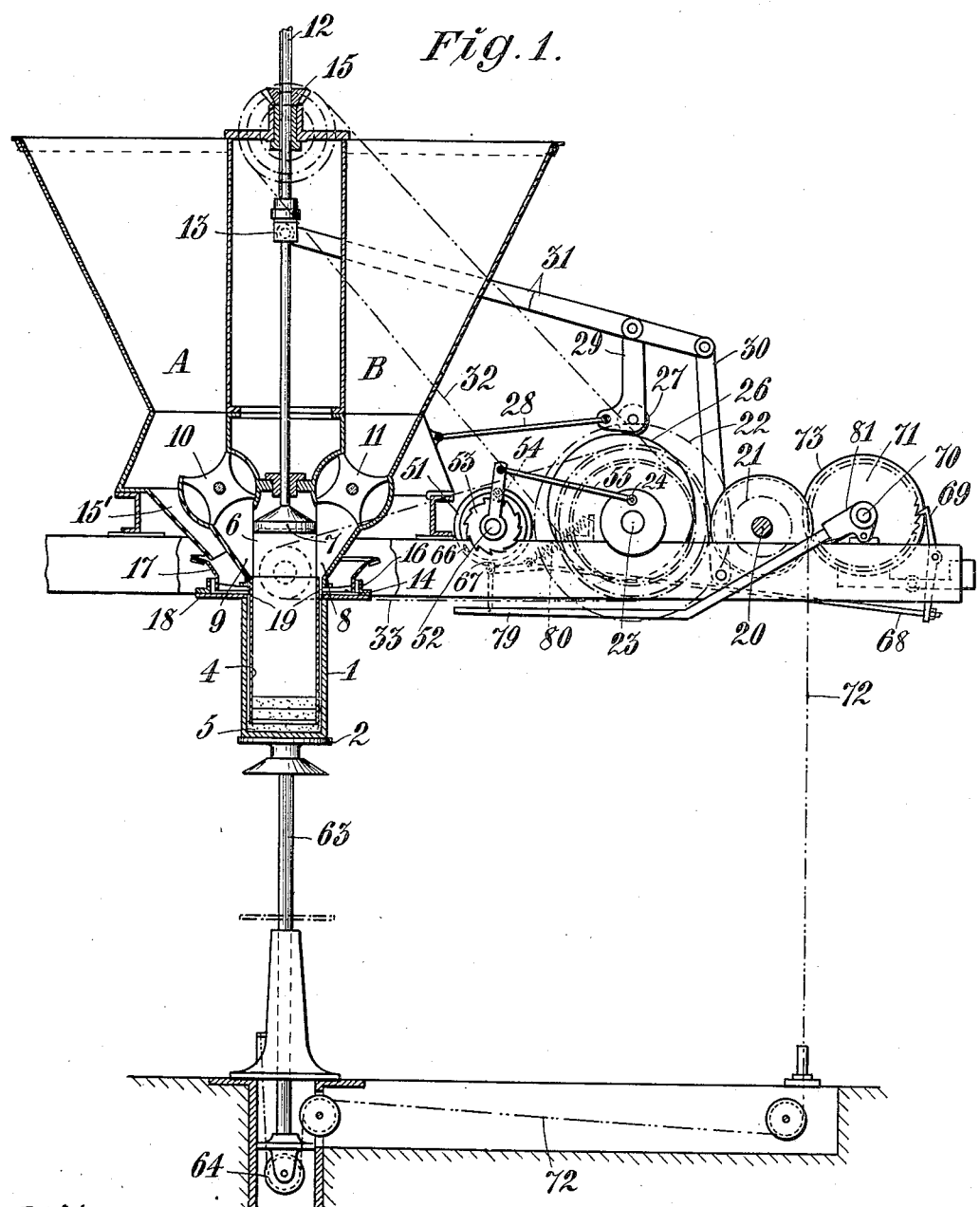

H. Å. ÅBJÖRNSSON & N. FREDRIKSSON.
APPARATUS FOR PACKING POWDERED MATERIAL IN CANS OR BARRELS.
APPLICATION FILED MAY 18, 1912.

1,049,029.

Patented Dec. 31, 1912.

2 SHEETS—SHEET 1.

Witnesses
McClelland Young
Alfred H. Moore

Inventors:
Herman Å. Åbjörnsson
and Nils Fredriksson.
By Barton & Folk,
Att'ys.

H. Å. ÅBJÖRNSSON & N. FREDRIKSSON.
APPARATUS FOR PACKING POWDERED MATERIAL IN CANS OR BARRELS.
APPLICATION FILED MAY 18, 1912.
1,049,029.
Patented Dec. 31, 1912.
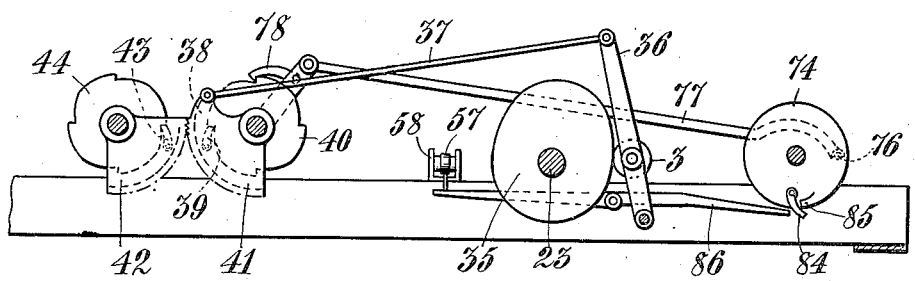
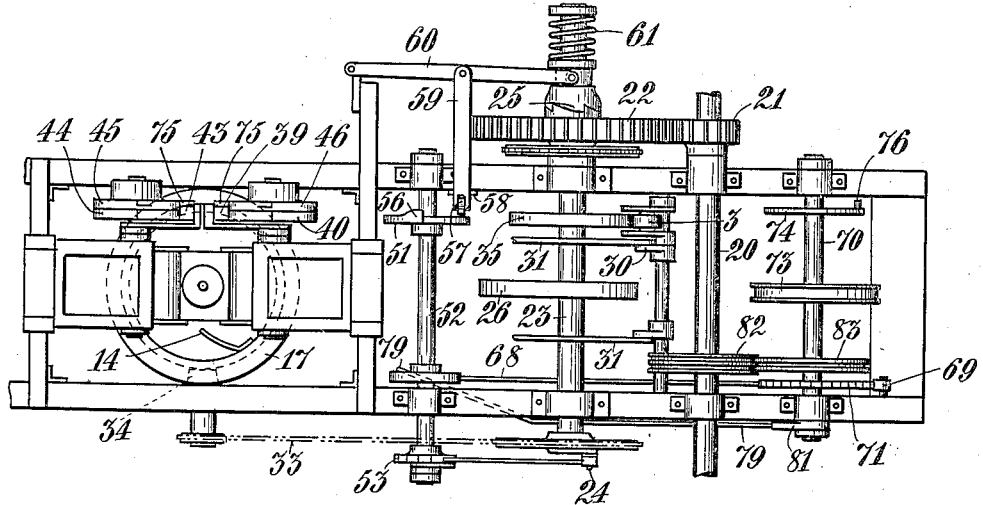

UNITED STATES PATENT OFFICE.

HERMAN ÅBJÖRN ÅBJÖRNSSON AND NILS FREDRIKSSON, OF SVEDALA, SWEDEN.

APPARATUS FOR PACKING POWDERED MATERIAL IN CANS OR BARRELS.

1,049,029.  Specification of Letters Patent.  Patented Dec. 31, 1912.

Application filed May 18, 1912. Serial No. 698,293.

*To all whom it may concern:*

Be it known that we, HERMAN ÅBJÖRN ÅBJÖRNSSON and NILS FREDRIKSSON, subjects of the King of Sweden, both residents of Svedala, Sweden, have invented new and useful Improvements in Apparatus for Packing Powdered Material in Cans or Barrels, of which the following is a specification, reference being had to the drawings accompanying and forming a part thereof.

For certain purposes it may be desirable to pack powdered material, generally of two or more kinds, in different layers in cans, barrels or the like, and at the same time to introduce between the inside of the can and the material a layer of powdered material, if desired of the same kind as occurring in the layers within the can.

This invention relates to an apparatus for performing such packing in a quick and reliable manner and by means of an apparatus which operates automatically and with a very small expense for maintenance and operation.

The invention is characterized mainly by this that the powdered material is introduced into the can through a stationary sleeve, embraced by the can which has a reciprocating motion up and down in such manner that the empty can is slid upon the sleeve and the ready-packed can is removed from the same. During this process the can stands upon a table, arranged to be alternately raised and lowered, while the stationary sleeve, fastened to the frame of the machine, communicates with a spout, or a plurality of spouts for the material to be packed. A piston within the sleeve is so arranged that it can have a reciprocating motion, and at the same time it may be rotated around its axis or the piston may only have a rotating motion.

In the accompanying drawings Figure 1 is a longitudinal sectional view of a machine embodying our invention, Fig. 2 is a side elevation of a part of the mechanism of the same machine, and Fig. 3 is a view of the machine as seen from above.

Referring to the drawings, 1 represents a can to be packed, supported by a table 2, arranged to be alternately lifted and lowered.

4 represents a cylindrical sleeve, fastened with its upper edge to the frame of the machine, suspended in the can, and reaching with its lower edge into a layer of powdered material 5 on the bottom of the can. A continuation of the sleeve 4 forms a cylindrical chamber 6 of the same diameter as the sleeve. A piston 7 is arranged to move up and down within the chamber and the sleeve. Openings 8 and 9 for the material to be packed communicate with the sleeve below the piston in its highest position. The materials to be packed are stored each in a hopper A or B, and are fed in certain proportions by means of feeding-rollers 10 and 11 which rotate stepwise and alternately, so that a portion of one material is fed every second time when the piston is in its highest position, and a portion of the other material is fed every other time. If more than two different materials are to be handled, a corresponding number of hoppers and feeding-rollers will be provided.

The piston 7 is secured to a piston rod 12, extending through a block 13, which is joined to a lever 31, and supports the piston so that the motion of the lever will lift or lower the piston. The upper part of the piston rod is splined and extends through the hub of a rotating bevel gear 15, so that the piston may be rotated with the gear at the same time as it is moving up and down. The rotation of the piston pressing upon the material in the can will cause an even distribution of the material. While in this manner one layer after another is packed inside the sleeve, the space between the sleeve and the walls of the can will also be filled with material fed from the hopper A through a passage 15' to the annular hopper 16. This hopper 16 is formed by a loose ring 17, resting on a plate 18, in which there is an opening 19 around the sleeve 4, corresponding to the opening between the sleeve and the wall of the can. The ring 17 rotates slowly around the sleeve 4 and is provided with vanes 14, Fig. 3, directed obliquely inward, which serve to move the mass of material inward toward the sleeve and into the space between the sleeve and the can, until the space is filled. In the meantime the interior of the sleeve is filled, layer after layer, to the height desired in the can. The motion of the piston 7—reciprocating and rotating—is then interrupted, as is also the rotation of the ring 17. The table 2 is loosened, and sinks by reason of the weight of the packed can, until the can will clear the sleeve 4, stationary with the frame. The packed can is then removed, an empty can substituted, and the table together with the empty can lifted, until the can strikes against the plate 18, when the movements are repeated, and the new can is filled in the manner described.

The mechanical means for performing the various movements required in the above described process can of course be arranged in many different ways, and would still fall within the scope of our invention. The means shown on the drawing are therefore to be regarded merely as an example for the purpose of illustrating the invention.

The movements are all taken from the rotating shaft 20, which drives the shaft 23 through the gears 21—22. To the shaft 23 is keyed a cam 26, which through the agency of the roller 27, the rod 29, guided by link 28, and the levers 31, guided by links 30, will give the reciprocating motion to the piston 7. The rotating movement of the piston is also obtained from shaft 23 through the chain 32 and the gears 15. The motion of ring 17 is accomplished through the chain 33 and the bevel gear 34, Fig. 3, which meshes with teeth on the ring 17. The feeding-rollers 10—11 are driven from the cam 35, Figs. 2–3, keyed on shaft 23, which cam by means of the roller 3, the links 36 and 37 and a lever 38 will serve to move a pawl 39 back and forth along the rim of a ratchet disk 40 fastened to the feeding-roller 11, and at the same time through the toothed segments 41 and 42 will move the pawl 43 along the rim of a second ratchet disk 44, fastened to the other feeding-roller 10. Each of the ratchet disks 40 and 44 is provided with four notches, so that for each stroke of the cam 35 the feeding-rollers will be rotated ¼ turn, which corresponds to the motion required for feeding material to one layer in the can. In order that the two feeding-rollers shall not move simultaneously but alternately, the marking disks 45—46 are provided, which disks are mounted loosely upon the shafts of the ratchet disks 44—40, and driven by separate pawls 75—75. Each of the marking-disks is also provided with four notches, but every second one of said notches does not cross the whole width of the rim, but leaves an even edge on the rim next to the ratchet disk. The pawls 39 and 43 which coöperate with the ratchet disks 40 and 44 are wide enough to cover the said edge, and for this reason they will only every second time alternately engage with the notches in the corresponding ratchet disks 44 and 40. The order of feed of material from the hoppers A and B is thus determined by the relative position of the marking disks and can be reversed by turning the marking disks forward ¼ turn independently of their normal motion due to the pawls 75. Such reversal is required each time a can is filled, when it is desired that the first and the last layer in the can shall consist of the same material.

For arresting the movements at the moment when the last layer is packed the arresting disk 51, Figs. 1–3, is provided, fastened on the shaft 52. The shaft 52 is rotated stepwise by the ratchet disk 53, coöperating with the pawl 54, which is moved through the link 55, connected to the crank pin 24 on the chain wheel 32. The ratchet disk 53 is so divided, and is moved at such a rate, that the shaft 52 together with the arresting disk 51 makes just one revolution for the number of revolutions of shaft 23, which correspond to the desired number of layers to be packed in the can. The arresting disk 51 carries a lug 56, so adjusted, that when the last layer is packed in the can, it will act upon the roller 57, mounted in the link 59, guided in a fork 58, so that the lever 60 will disengage the coupling 25 thereby stopping all the movements.

The table 2 is supported by the rod 63 and block 64, from which the rope 72 extends to the sheave 73. The sheave is keyed to shaft 70, to which is also fastened the ratchet wheel 71, engaging with pawl 69. The rod 68 connects the pawl 69 to the hook 67, which coöperates with a lug 66 fastened to the shaft 52 in such manner that, at the same moment as the lug 56 will act upon the roller 57 to arrest the movements, the pawl 69 will become disengaged from the ratchet-wheel 71, and the shaft 70 with sheave 73 will be free to rotate by reason of the tension in the rope 72, caused by the weight of the table and the packed can. Hence the table will rapidly descend, so that the can may be removed. To the shaft 70 is also keyed a disk 74 having a crankpin 76, which coöperates with rod 77 to move the pawl 78 along the rim of the marking disk 46. When now the shaft 70 rotates ½ turn, which corresponds to the distance the table will drop, the pawl 78 will be carried over a notch in the disk 46.

When the filled can is removed, and an empty can has been placed on the table 2, the lever 79 is depressed. The lever 79 is joined through a link to the hook 67, which will then be disengaged from the lug 66. The spring 80 will then pull the hook 67 and the rod 68 backward, so that the pawl 69 will reëngage the ratchet-wheel 71. But the lever 79 is fastened to the bearing 81, which is eccentrically mounted in such manner that a depression of the lever 79 will cause the shaft 70 to approach the shaft 20. To the said two shafts are fastened the friction wheels 83 and 82 which will engage with one another when the two shafts are close enough, and since the shaft 20 rotates continuously the shaft 70 will also be rotated as long as the downward pull remains on the lever 79. By the rotation of the shaft 70 the line 72 will be wound up on the sheave 73, thereby lifting the table 2 with the can 1, until the can meets the resistance offered by the plate 18. At the same time the pawl 69 will engage the ratchet wheel 71, so that a backward rotation is prevented, and the can will remain in its position when the pull on the lever 79 is discontinued, and the friction-wheels 82, 83 no longer touch each other. The movement of the can corresponds to ½ turn of the shaft 70. In the meantime the crank pin 76 will restore the rod 77 and the pawls 78 to their former positions, thereby moving the marking disks 45 and 46 through ½ turn so that the order of feed becomes reversed as before described.

The disk 74 is provided with a finger-like hook 84, Fig. 2, arranged to swing free in one direction, but prevented by the lug 85 from swinging in the other direction. When the disk 74 moves the first time while the table 2 descends, the finger 84 will therefore pass the end of the lever 86, directed toward the disk 74, but when the disk rotates in the opposite direction, while the table 2 is being lifted, the said finger will depress the end of the lever 86. The other end of the lever is thus lifted and moves the roller 57 so that it escapes the lug 56 and permits the strong spiral spring 61 to close the coupling 25. The shaft 23 will then again come into rotation, and a new cycle of the above described movements will begin, until one more can is packed, and the shaft with the arresting disk 51 is rotated one turn, when the motion is again arrested, and the packed can will sink automatically as described. The only manual operation necessary is thus to substitute an empty can for the packed can, and to slowly pull on the lever 79 until the can is resisted by the plate 18. All the other operations are performed automatically.

Having thus described our invention, what we claim is:

1. In an apparatus for packing powdered material in a can, the combination of a packing sleeve, a table below the sleeve arranged to support the can to be packed, means for lifting the table so that the can embraces the sleeve, means for filling material into the can through the sleeve and means for filling material into the space between the sleeve and the walls of the can.

2. In an apparatus for packing powdered material in a can, the combination of a packing sleeve, a table below the sleeve arranged to support the can, means for lifting the table so that the can embraces the sleeve, means for filling different materials in layers into the can through the sleeve and means for filling material into the space between the sleeve and the walls of the can.

3. In an apparatus for packing powdered material in a can, the combination of a packing sleeve, a table below the sleeve arranged to support the can to be packed, means for lifting the table so that the can embraces the sleeve, means for filling material into the can through the sleeve, a receptacle containing material to be filled into the space between the sleeve and the walls of the can, and means for filling the material contained in said receptacle into said space.

HERMAN ÅBJÖRN ÅBJÖRNSSON.
NILS FREDRIKSSON.

Witnesses:
H. HÄRSTED,
A. OHLSSON.